United States Patent [19]

Neal

[11] 3,809,855
[45] May 7, 1974

[54] THERMAL SENSING APPARATUS
[75] Inventor: Danny Marvin Neal, Lexington, Ky.
[73] Assignee: International Business Machines Corporation, Armonk, N.Y.
[22] Filed: June 12, 1973
[21] Appl. No.: 369,369

[52] U.S. Cl. ............................... 219/216, 219/471
[51] Int. Cl. ....................... H05b 1/00, G03g 15/70
[58] Field of Search............ 219/216, 388, 469–471; 432/60, 228; 250/317–319; 355/9; 100/93 RP

[56] References Cited
UNITED STATES PATENTS
3,697,726   10/1972   Geronime ........................... 219/469
3,508,185   4/1970   Tulchinsky ....................... 338/25 X Primary Examiner—C. L. Albritton
Attorney, Agent, or Firm—John W. Girvin, Jr.

[57] ABSTRACT

A contact type thermal sensing apparatus for a hot roll fusing unit includes a fail-safe detector to insure intimate contact between the thermal transducer and the monitored roll surface. The fail-safe detector also insures intimate contact between an over temperature sensing device and the monitored roll surface. The thermal transducer includes a thermally and electrically conductive contact which is held against the surface of the rotating conductive fuser roll. The output of the transducer is utilized to control the amount of heat supplied to the roll. A second thermally and electrically conductive contact is held against the surface of the rotating conductive roll and includes a thermal fuse which prevents further heat application to the roll should the surface thereof become overheated. The fail-safe detector comprises an electrical continuity circuit which includes the two contacts and the conductive roll. If either of the contacts becomes separated from the roll, electrical continuity therebetween is broken and the detector output prevents further heat application to the roll. The fail-safe detector thus insures that the transducer and thermal fuse contacts are intimately contacting the roll thereby preventing excessive overheating of the roll occasioned by the loss of such contact.

7 Claims, 5 Drawing Figures

THERMAL SENSING APPARATUS

CROSS-REFERENCE TO RELATED APPLICATION

The following application is assigned to the same assignee as the present application:

U.S. Pat. application Ser. No. 317,482, entitled "High Speed Printing System With Heated Roll Fuser," James A. Machmer, inventor, filed Dec. 21, 1972.

BRIEF BACKGROUND OF INVENTION

1. Field

This invention relates in general to improvements in temperature sensing devices and, more particularly, to a fail-safe detector utilized in conjunction with a contact type thermal sensing apparatus.

2. Description of the Prior Art

Various temperature sensing devices have long been utilized to monitor and control the temperature of a surface. These devices have included both proximity sensors and contact sensors, the output signals of which are utilized to control the application of heat to the monitored surface.

Contact sensors have been preferred when it is desirous to closely control the operating temperature of such a heated surface because of their rapid response time and because of the predictable heat exchange relationship with the monitored surface. When such contact sensors have been used, it has been necessary to insure good physical contact between the contact sensing device and the monitored surface especially when the surface is subjected to motion and contamination as would occur, for example, in roll fusing apparatus commonly utilized in electrophotographic equipment.

Prior attempts to utilize such a contact sensor have included resilient biasing means which urge the sensor into intimate contact with the moving roll surface resulting in both surface wear and sensor wear. Additionally, contamination can cause actual separation of the sensor from the surface resulting in an overheating condition. A further prior art approach has been to utilize a second device such as a thermal fuse to sense an overheat condition such as would be caused by sensor-surface separation in order to prevent the further application of heat to the surface. However, such a device is subject to the same wear and contamination limitations as the aforedescribed temperature sensors.

SUMMARY

In order to overcome the above noted shortcomings of the prior art and to provide assurance of intimate contact between a contact type temperature sensing transducer and a monitored surface, a fail-safe detector is utilized which checks the electrical continuity between the interface of the temperature sensing transducer and the monitored surface. Whenever there is a lack of electrical continuity thereby indicating separation of the sensor from the surface, the fail-safe circuit prevents the further application of heat to the surface thereby preventing an over temperature condition. The fail-safe circuit also monitors the electrical continuity between an over temperature sensing device and the monitored surface. This insures that the over temperature device is properly positioned to sense an over temperature condition resulting from failures in the control circuits. The fail-safe circuit thus eliminates the necessity for overly biasing the contact sensor and the over temperature sensing device into the moving monitored surface thereby preventing wear of the various parts.

Accordingly, it is the principle object of the invention to provide an improved contact type temperature sensing system.

It is a further object of this invention to provide an economical fail-safe detection system for use with a contact type thermal sensing apparatus.

A still further object of the invention is to provide a fail-safe detector for both a contact type thermal sensing transducer and for an over temperature sensing transducer, both of which are utilized in conjunction with sensing the temperature of the same surface.

The foregoing objects, features, and advantages of the invention will be apparent from the following more particular description of the preferred embodiment of the invention as illustrated in the accompanying drawing.

IN THE DRAWING

DESCRIPTION

Figure 1:
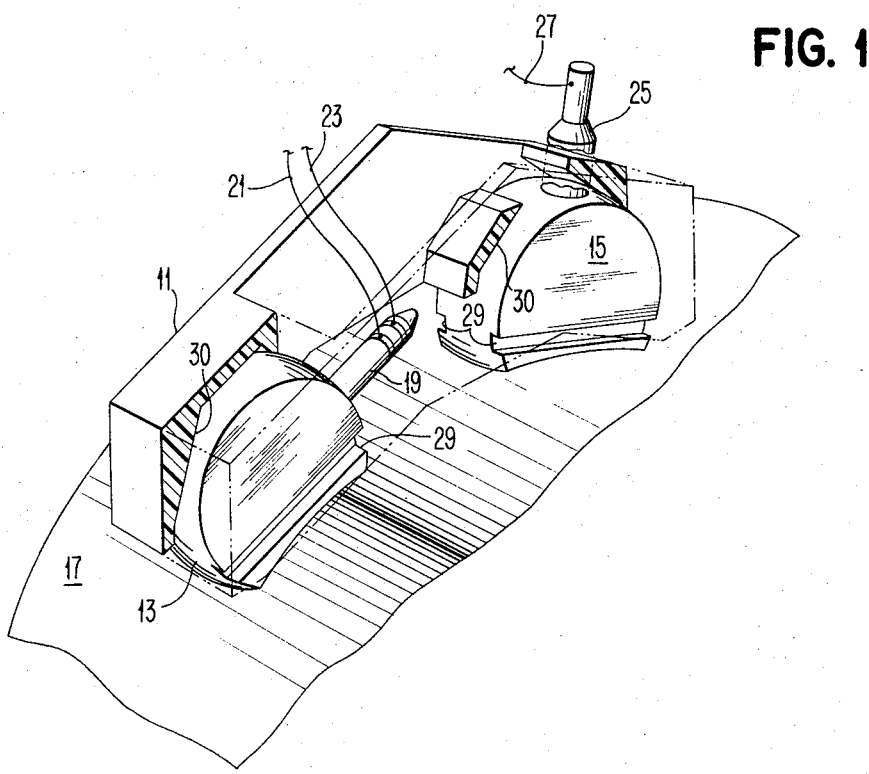
FIG. 1 is a three dimensional illustration, partially in section, of the thermal sensing apparatus and the monitored surface.

Referring now to FIG. 1 of the drawings, a three dimensional illustration, partially in section, of the thermal sensing apparatus and the monitored surface is depicted. The thermal sensing apparatus comprises a holder 11 for maintaining contacts 13 and 15 in intimate contact with the monitored surface 17. The holder is in turn pivotally mounted within a bracket (not shown) to facilitate the seating of the contacts on the monitored surface. The holder is made of electrical and thermal insulator material such as a plastic which is not readily deformed with heat such as Astyrel *360 (*A trademark of the 3M Company).

The contact 13 has embedded therein a thermal transducer 19 which provides an output signal through leads 21 and 23 indicative of the temperature of the monitored surface 17. The contact 15 has a thermal fuse 25 embedded therein. The thermal fuse produces an open circuit condition over lead 27 when the monitored surface 17 reaches a predetermined maximum temperature condition. As will be described hereinafter, a continuity check is made between leads 21 and 27 to assure that the contacts 13 and 15 are intimately seated against the conductive monitored surface 17.

In order that the thermal transducer 19 and the thermal fuse 25 are rapidly responsive to changes in temperature at surface 17, the contacts 13 and 15 must be thermally conductive. Additionally, in order to facilitate the electrical continuity check, the contacts 13 and 15 must also be electrically conductive. Further, the contacts must possess good mechanical strength and exhibit resistance to wear and must further provide a lubricious contact to prevent marring of the surface 17. Graphite contacts made of graphite stocks such as Ohio Carbon W157 and U.S. Graphitar 77 have been found to exhibit these characteristics. That is, contacts made of such materials provide good thermal conductivity (eg. 30 BTU/FT$^2$/FT/HR/F°.) and are electrically conductive. The graphite shoes are ground and polished with the same tolerance of the surface 17 to provide the best statistical surface matching. Both the contact and the surface 17 mating surfaces should have a V15 or better finish. The size of the contacts is controlled to present a low thermal mass for rapid response. Additionally, the thermal transducer 19 and the thermal fuse 25 are located a small thickness away from the surface 17 to minimize thermal gradients through the material. A wide contact area is utilized to maximize the ratio of thermal contact area to the total surface area.

The graphite contacts 13 and 15 are loosely mounted in the holder 11 and include slotted guides 29 which fit within mating tongues (not shown) located within the holder. The contacts are self seating against planar surfaces 30 allowing pivotal movement of the spherical shaped contacts for intimate mating of the contacts to the surface 17.

The thermal transducer 19 includes a mercury thermostat of well known design. Mercury in a column within a glass bottle expands to effect a circuit closing which is utilized as a simple on-off control to a heating element. The thermal fuse 25 is a simple heat sensitive fuse also of well known design which causes an open circuit condition to exist when the temperature of the fuse exceeds a predetermined temperature level. Both the thermal transducer 19 and the thermal fuse 25 are secured within a hole of their respective contacts 13 and 15 by a thermally and electrically conductive cement. A spring coupler could also be utilized to provide a thermal and electrical connection between the contact and the thermal transducer or thermal fuse while allowing the thermal transducer or fuse to be removed from its associated contact for servicing.

Figure 2:
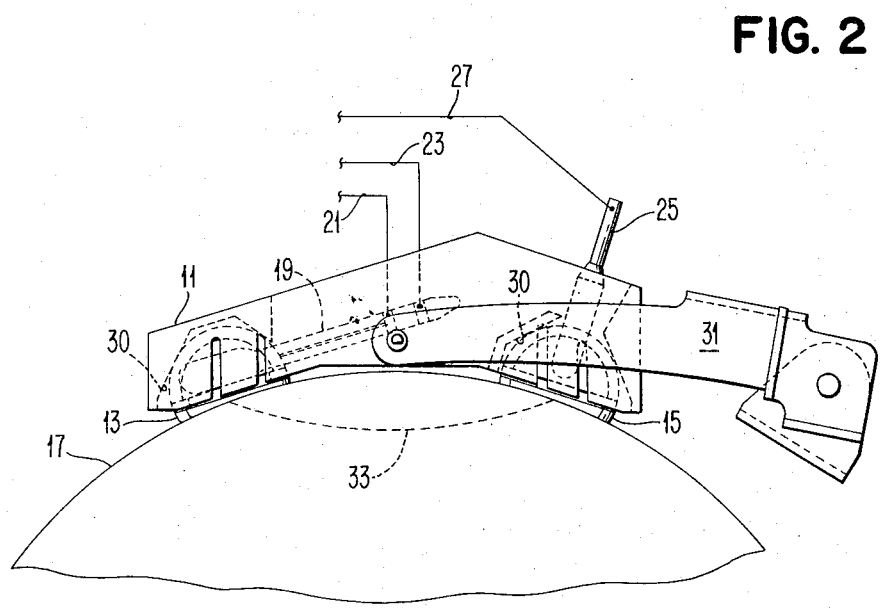
FIG. 2 is a side elevation view of the thermal sensing apparatus and the monitored surface.

Referring now to FIG. 2 of the drawings, a side elevation view of the thermal sensing apparatus and the monitored surface is depicted. A pivoted bracket 31 pivotally secures the holder 11 to the surface 17. As will be described hereinafter, the electrical continuity between leads 27 and 21 is monitored to insure that the contacts 13 and 15 are physically contacting the conductive monitored surface 17. That is, when the contacts 13 and 15 are intimately contacting the surface 17, electrical continuity exist between lead 21 through the thermal transducer 19, contact 15, and thermal fuse 25. The conductivity path of the surface 17 is depicted by line 33.

Figure 3:
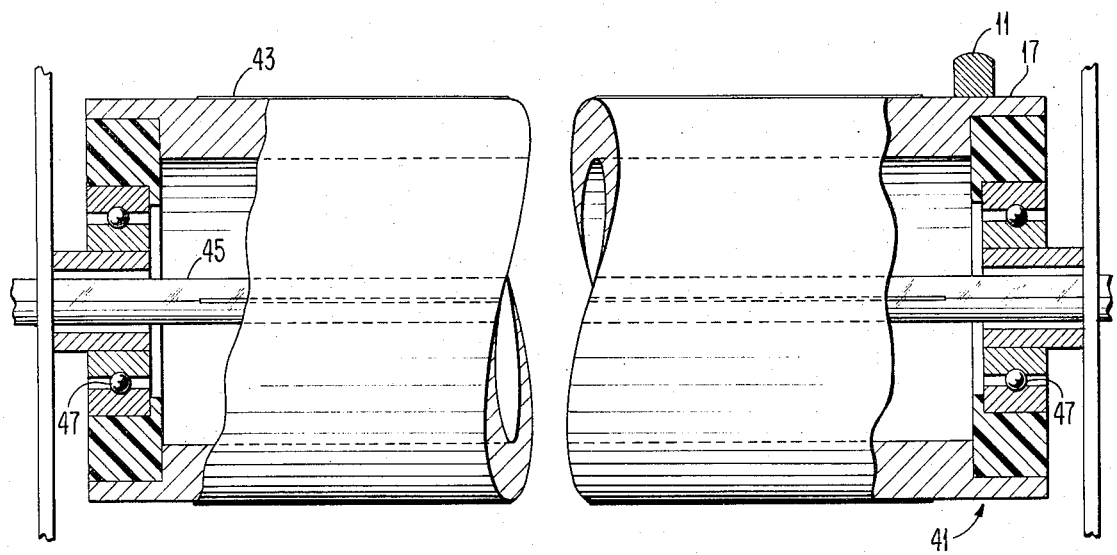
FIG. 3 is a side view of a roll fuser apparatus which includes the thermal sensing apparatus of the present invention.

Referring now to FIG. 3 of the drawings, a side view of a roll fuser apparatus including the thermal sensing apparatus of the present invention is depicted. A detailed description of the construction of the roll fusing apparatus may be found in the aforereferenced copending application of James A. Machmer. In general, the fusing apparatus comprises a metallic hollow cylindrical roll 41 having an elastomer material 43 coated over the central portion thereof. A heating lamp 45 extends the length of the roll within the central cavity thereof. When energized, the heating lamp uniformly heats the metallic cylindrical roll. It has been found that rolls made of aluminum exhibit good thermal characteristics. Heat is passed from the roll to the elastomer surface. The roll is rotatably mounted on bearings 47. A sheet of support material such as paper carrying thermoplastic toner particles is fed past the rotating roll in pressure contact therewith whereat the toner particles are fused to the support substrate.

Holder 11 carrying the aforedescribed thermal transducer and thermal fuse and their associated contacts is pivotally mounted adjacent the roll 41 so that the contacts contact monitored surface 17. The output signal of the thermal transducer is utilized to control the turn on and turn off of the heating lamp 45 while the thermal fuse assures that the metallic cylindrical roll 41 does not reach an over heated condition.

Figure 4:
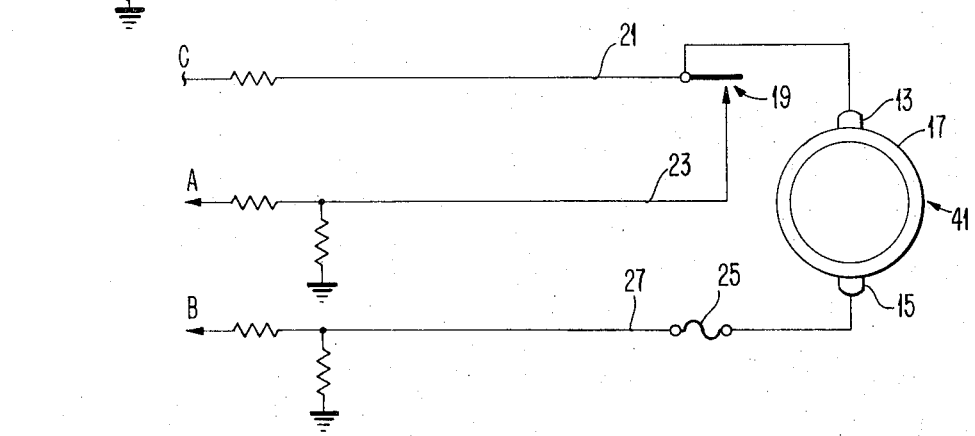
FIG. 4 is a schematic illustration of the fail-safe detector of the thermal sensing apparatus of the present invention.

Referring now to FIG. 4 of the drawings, a schematic illustration of the fail-safe detector of the thermal sensing apparatus of the present invention is depicted. Contacts 13 and 15 sense the surface 17 of roll 41. Lead 21 connected to contact 13 is biased at approximately 7 volts D.C. by a power supply (not shown) connected to terminal C. When the mercury switch associated with thermal transducer 19 closes thereby indicating that the surface 17 of roll 41 is sufficiently heated, the 7 volt signal from terminal C is applied to terminal A via leads 21 and 23.

The 7 volt D.C. signal applied by lead 21 to contact 13 is applied to contact 15 via the conductive surface 17. Providing thermal fuse 25 is not open and providing that both contacts 13 and 15 are intimately contacting the conductive surface 17, a 5–7 volt signal appears at terminal B. Should either thermal fuse 25 open or should either one or both of the contacts 13 and 15 become displaced from the surface 17, the signal appearing at terminal B approaches ground. It is noted that while surface 17 has been described as a conductive surface, it can be formed of a material which will give a measurable voltage drop between terminals 13 and 15. Should this voltage drop become greater indicating poor contact between the contacts 13 and 15 and the surface 17, the control circuit to be described would indicate a failure condition.

Figure 5:
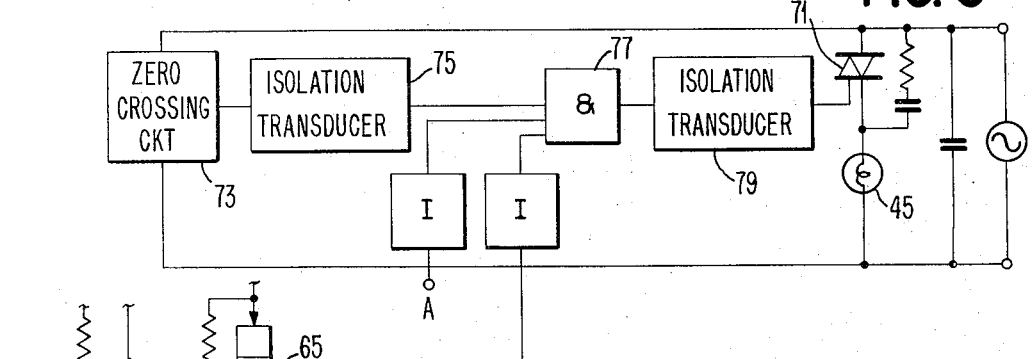
FIG. 5 is a schematic circuit diagram of the fail-safe detector and lamp control.

Referring now to FIG. 5 of the drawings, a schematic circuit diagram of the fail-safe detector and lamp control is depicted. As described heretofore, a 5–7 volt signal appears at terminal B when the contacts 13 and 15 of FIG. 4 are properly seated and when the thermal fuse 25 is not open. This signal is applied to the base electrode of transistor 61 which together with transistor 63 forms a differential amplifier. When the signal becomes less than 5 volts indicating that either the thermal fuse 25 is open or that one of the contacts 13 or 15 has become displaced from the surface 17, transistor 61 is biased off therefore causing transistor 63 to turn on. When transistor 63 turns on, the collector electrode of the transistor 65 provides an output high logic level voltage signal indicating or warning that a failure has taken place.

As described heretofore, a high logic level voltage signal at terminal A of FIG. 4 indicates that the surface 17 of FIG. 4 has reached its requisite temperature and that it is no longer desirous to apply heat thereto. The lack of a high logic level voltage signal at the output of transistor 65 and at the output of terminal A is utilized to control the turn on of the heating lamp 45. The heating lamp 45 is turned on under the control of triac 71. Triac 71 may be turned on at each zero crossing of the input A.C. wave form. A zero crossing circuit 73 detects the zero crossing of the A.C. input wave form and a pulse is provided by the isolation transducer 75 to the And gate 77. The inverted signals from terminal A and from transistor 65 are also provided to the And gate 77. The And gate 77 provides an output signal with each zero crossing pulse providing that the output of transistor 65 is not high and providing that the output of terminal A is not high. The signal output from the And gate 77 is provided to an isolation transducer 79 which in turn gates the traic 71 which remains on during the half cycle of A.C. input.

The lamp 45 thus heats the roll 41 (FIG. 3) when the temperature of surface 17 falls below a predetermined temperature only if a warning signal is not supplied by transistor 65. If such a warning signal is supplied indicating either that the roll 41 has overheated or that contacts 13 or 15 (FIG. 5) are not properly seated on surface 17, further energization of the lamp is prevented.

In many devices it is desirous to merely indicate a potential failure of the temperature transducer. In such systems, the warning signal could be utilized to light an indicator lamp.

Additionally, it is noted that a destructable thermal fuse 25 has been described for producing an open circuit condition when there is an over temperature condition. It is recognized by those skilled in the art that various fuse type devices such as bi-metallic contacts could be utilized to produce such an open circuit condition.

Further, it is usually desirous to use a more complex control system in conjunction with a roll fuser device. In such a system, the traic 71 is automatically gated on for ½ cycle of the A.C. input out of a predetermined number of such half cycles. This keeps the lamp filament from over-cooling. Thereafter, whenever the thermal transducer 19 is open indicating that additional heat need be supplied, the triac 71 is gated on until the thermal transducer 19 indicates that the surface 17 of FIG. 4 has reached the desired temperature. The failsafe or warning signal output of transistor 65 is then utilized to effect complete shutdown of the triac preventing further operation of the fuser device in both the standby condition and the heating condition.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. A contact type thermal sensing apparatus for sensing the temperature of a surface comprising:
   a thermal transducer for supplying an electrical output signal representative of the temperature of said surface;
   a first thermally and electrically conductive contact mounted in physical contact with said surface and in heat exchange contact with the thermal transducer;
   a second electrically conductive contact mounted in physical contact with said surface;
   electrical circuit means connected to the first and second contacts for monitoring the electrical continuity between the contacts and the surface and for providing an output warning signal when said continuity is broken;
   means responsive to said warning signal for indicating that the electrical output signal of the transducer may be erroneous.

2. The thermal sensing apparatus set forth in claim 1 further including,
   controllable heat supply means responsive to the output electrical signal of the thermal transducer for supplying heat to the surface when the surface reaches a predetermined temperature;
   and wherein said means responsive to said warning signal includes control means operable on said controllable heat supply means to prevent said heat supply means from supplying heat to said surface when said continuity is broken.

3. The thermal sensing apparatus set forth in claim 2 further including a thermal fuse for disabling said controllable heat supply means when said surface reaches an over temperature condition and wherein said second contact is thermally conductive and in heat exchange contact with said thermal fuse.

4. The thermal sensing apparatus set forth in claim 3 wherein said surface is electrically conductive.

5. A temperature control system for controlling the temperature of an electrically conductive surface of a member comprising:
   a first thermally and electrically conductive contact mounted in physical contact with the surface of the member;
   a thermal transducer mounted in heat exchange contact with the first contact for supplying an output signal indictive of the temperature of the surface;
   a second electrically conductive contact mounted in physical contact with the surface of the member;
   circuit means connected to the first and second contacts for monitoring the electrical continuity between said contacts and said surface and for providing an output warning signal when said electrical continuity is broken;
   a selectively operable heat source for heating said member;
   control means responsive to the output signal of the transducer for operating the heat source when the temperature of the surface reaches a predetermined temperature and responsive to said output warning signal for preventing operation of said heat source when said electrical continuity is broken.

6. The temperature control system set forth in claim 5 wherein said surface of said member is mounted for relative motion with respect to said first and second contacts.

7. The temperature control system set forth in claim 5 further including a thermal fuse for disabling said heat source when said surface reaches an over temperature condition and wherein said second contact is thermally conductive and in heat exchange contact with said thermal fuse.

* * * * *